(12) United States Patent
Manzo

(10) Patent No.: US 10,040,399 B1
(45) Date of Patent: Aug. 7, 2018

(54) APPARATUS FOR HANGING PERSONAL ITEMS IN A MOTOR VEHICLE

(71) Applicant: Thomas A Manzo, Kunkletown, PA (US)

(72) Inventor: Thomas A Manzo, Kunkletown, PA (US)

( * ) Notice: Subject to any disclaimer, the term of this patent is extended or adjusted under 35 U.S.C. 154(b) by 0 days.

(21) Appl. No.: 15/910,791

(22) Filed: Mar. 2, 2018

(51) Int. Cl.
*B60R 7/04* (2006.01)
*B60N 2/90* (2018.01)

(52) U.S. Cl.
CPC ............ *B60R 7/043* (2013.01); *B60N 2/90* (2018.02); *B60N 2002/905* (2018.02)

(58) Field of Classification Search
CPC ..... B60R 7/043; B60R 2011/0012–2011/0017
USPC ................................................. 224/275, 927
See application file for complete search history.

(56) References Cited

U.S. PATENT DOCUMENTS

| | | | | |
|---|---|---|---|---|
| 4,971,393 A * | 11/1990 | Maisenhalder | ........ | A47C 7/383 297/397 |
| 5,415,457 A * | 5/1995 | Kifer | ........ | B60N 2/70 224/275 |
| 5,791,614 A | 8/1998 | Sims | | |
| 6,231,017 B1 * | 5/2001 | Watkins | ........ | B60R 11/0211 248/274.1 |
| 6,260,750 B1 * | 7/2001 | Chiang | ........ | B60R 7/10 224/275 |
| 6,315,180 B1 * | 11/2001 | Watkins | ........ | B60R 11/04 224/275 |
| 6,651,941 B1 * | 11/2003 | Kinsel | ........ | A45F 5/1026 248/100 |
| 7,395,997 B2 * | 7/2008 | Padden | ........ | B60R 7/10 248/303 |
| 7,784,864 B2 * | 8/2010 | Feder | ........ | B60R 7/043 297/188.06 |
| 8,678,680 B1 * | 3/2014 | Pelini | ........ | F16M 11/06 224/275 |
| 9,114,766 B1 * | 8/2015 | Pelini | ........ | B60R 11/04 |
| D741,396 S * | 10/2015 | Pelini | ........ | D16/242 |
| 9,586,529 B1 | 3/2017 | Sanchez | | |
| 2002/0175254 A1 * | 11/2002 | Lee | ........ | B60R 11/0235 248/289.11 |
| 2006/0261229 A1 | 11/2006 | Hirota | | |
| 2011/0101055 A1 | 5/2011 | O'Neill | | |

* cited by examiner

*Primary Examiner* — Brian D Nash
(74) *Attorney, Agent, or Firm* — Axenfeld Law Group, LLC; Robert R. Axenfeld; Vik Patel

(57) ABSTRACT

Described is an apparatus that allows items to be hung from a hook next to a motor vehicle headrest that can be installed to the posts of that headrest. The apparatus includes a first arm, a second arm, a pin for pivoting, and a hook. The pin allows the arms to swivel in a scissor-like fashion, which makes installation and removal of the apparatus quick. The two arms each have a set of half-circular notches and a slot area that allow the apparatus to be secured to the posts of the headrest. The hook is located at the end of one of the arms proximal to the pin. Items can be hung from the apparatus, which frees up seat and floor space and can also prevent items from picking up dirt from the seat or the floor.

11 Claims, 3 Drawing Sheets

APPARATUS FOR HANGING PERSONAL ITEMS IN A MOTOR VEHICLE

BACKGROUND

Where does a driver of an automobile place his/her personal items, such as a purse, gym bag, computer bag, store bag, or hat? If he/she places any of these personal items on the rear seat, they are often out of reach while driving. And if the driver attempts to reach back to find these items on the rear seat, he/she may become distracted while driving.

Even if a driver places personal items on the passenger seat next to him/her while driving alone, any fast stop or quick turn can cause the personal items to slide off the seat, and on to the vehicle floor. Once on the floor, the contents in a purse or bag may spill out, and roll around on the floor or underneath the seat.

Placing items on the floor of a car is also less than ideal, because items get stepped on, or soiled. Additionally, as mentioned above, a purse or bag placed on the floor of a car may fall over, causing the contents therein to spill out and roll around on the floor.

If a driver rides with passenger and asks the passenger to carry the personal item on his/her lap, it may pose an imposition to the passenger, especially on a longer trip. Needless to say, finding a suitable location to place a purse, hat, or similar item in a vehicle is less than ideal.

SUMMARY

Described is an apparatus for hanging personal items in a motor vehicle so that the personal items are readily accessible to the either the driver or passenger, yet are secured.

In one embodiment, the apparatus attaches to posts of the headrest of either the driver or passenger seat. The apparatus may include a first arm, a second arm, a pin, and a hook.

The first arm includes a set of half-circular notches extending along a portion of an inner edge of the first arm. Each half-circular notch is configured to fit coextensively around about half of a first post of the headrest when the hanger apparatus is attached to the posts of the headrest. The first arm also includes an elongated slot area extending along another portion of the inner edge. This slot area is positioned to fasten around the second post of the headrest when the hanger apparatus is attached to the posts of the headrest.

The second arm includes a second set of half-circular notches extending along a portion of an inner edge of the second arm, each one of the half-circular notches oppositely aligned with the first set of half-circular notches. Like the half-circular notches of the first arm, each half-circular notch on the second arm is configured to fit coextensively around about half of the first post of the headrest. The first and second sets of half-circular notches generally form a circle to fit coextensively around the first post. The second arm also includes a slot area similar to that on the first arm. This slot area is oppositely aligned with the slot area on the first arm and is positioned to fit around the second post of the headrest from the opposite direction of the first-slot area.

At least one pin (i.e. a hinge post) is located at an end portion of both the arms. The pin pivotally connects the first and second arms together, and allows the first and second arms to swivel toward or away from each other in a scissor-like fashion at an axis point about the pin.

The hook is positioned at a distal end of the first or second arm. Thus, when the first and second arms are fastened around the posts of a headrest, the hook may extend beyond the headrest area.

Because the slot area is elongated, the distance the hook extends beyond the headrest area is adjustable depending upon which pair of notches is selected to fasten around one of the posts of the headrest.

In one embodiment, the hook is positioned proximal to the pin. The hook allows items to be hung in between the front driver and passenger seats, so that the items are secured, and yet are readily accessible to either the driver or passengers in the vehicle.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment," "an embodiment," "an aspect," "an implementation," "an example," or similar formulations, means that a particular feature, structure, operation, or characteristic described in connection with the embodiment is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION

Described is an apparatus for hanging personal items (not shown) in a motor vehicle. For instance, FIG. 1 shows an example of apparatus 100 attached to posts 101(1), 101(2) of a headrest 103 of vehicle seat 105.

Figure 1:
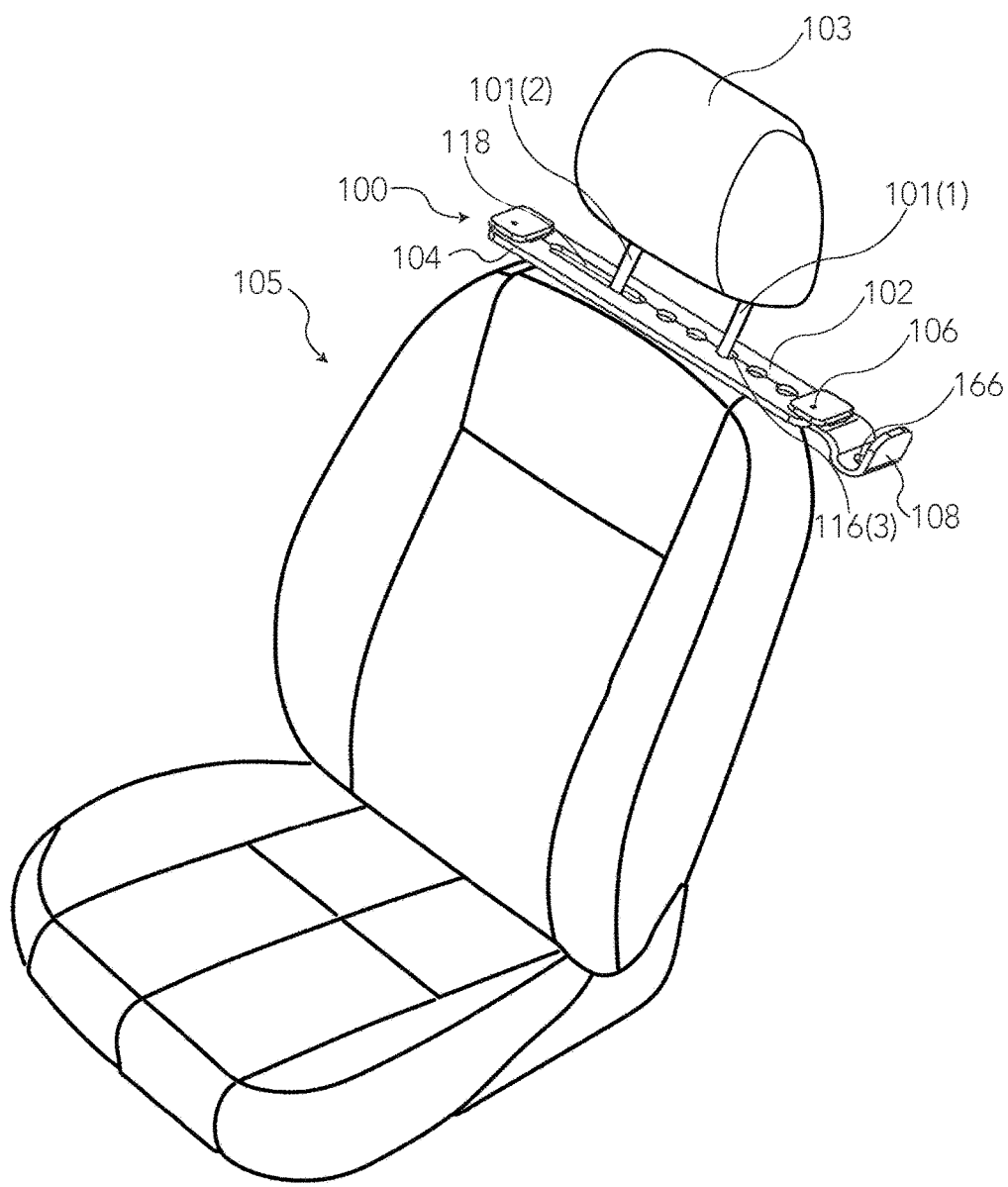
FIG. 1 shows a perspective view of an embodiment of the hanger apparatus installed on the posts of a headrest.

As depicted in FIG. 1, apparatus 100 includes a first arm 102 and a second arm 104 fastened around posts 101(1), 101(2). Apparatus 100 also includes a pin 106 and a hook 108.

First Arm

Figure 2:
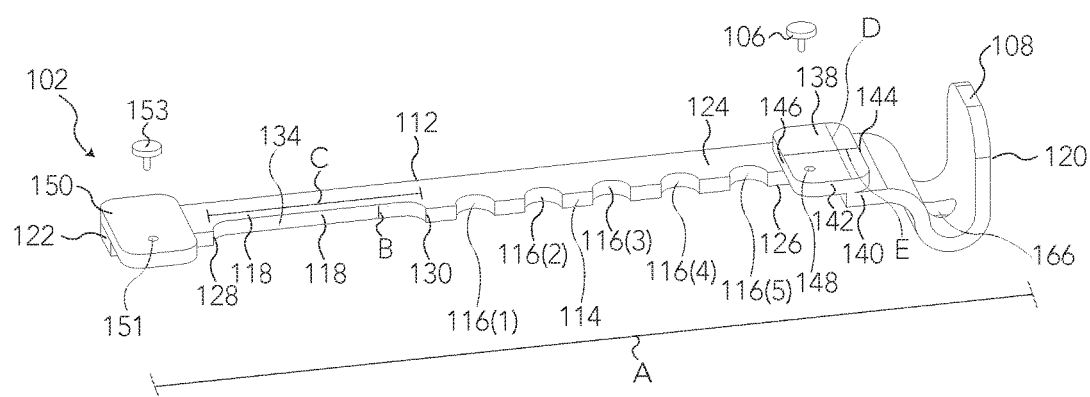
FIG. 2 shows a perspective view of the first arm and hook from an embodiment of the hanger apparatus.

FIG. 2 depicts a perspective view of arm 102. Referring to FIG. 2, arm 102 includes an outer edge 112 and inner edge 114.

Located along inner edge 114 is a first set of half-circular notches 116(1), 116(2), 116(3), 116(4), 116(5), and slot area 118. In the pictured embodiment, arm 102 also includes hook 108.

Arm 102 is between about twelve and fourteen inches in length measured (a distance A) between distal end 120 of hook 108 to distal end 122 of arm 102.

The height of arm 102 measured (a distance B) between a top surface 124 and bottom surface 126 of arm 102 is between approximately one-eighth inch and one-half inch thick. As appreciated by those skilled in the art after having the benefit of this disclosure, the dimensions of arm 102 may be greater or smaller than those mentioned above.

Slot area 118 extends along inner edge 114. In one embodiment, slot area 118 is approximately two inches in length (or a distance C) measured between points 128 and 130. The depth of slot area 118 measured between an innermost edge (i.e., cutout) 134 of inner edge 114 and the outer most surface 136 of inner edge 114 is approximately between one-quarter inch and one-half inch or a little over half the radius of a standard post of a headrest.

First set of half-circular notches 116(1), 116(2), 116(3), 116(4), and 116(5) are also located along inner edge 114 forming smaller cutouts or half-circular notches therein. Specifically each notch, referred to generally as 116, are half circles, having a radius approximately between one-quarter inch and one-half inch or a little over half the radius of a standard post of a headrest. In other words, each notch 116 of the first set of notches is configured to fit coextensively around about half of a standard headrest post.

So slot area 118 is positioned to abut one headrest post, while a particular notch 116(1), 116(2), 116(3), 116(4) or 116(5) is configured to abut the other headrest post. In other words, as shown in FIG. 1, slot area 118 encircles post 101(2), while notch 116(3) encircles post 101(1). Because the distance between post 101(1) and post 101(2) may differ depending on the model of the vehicle, having an elongated slot area 118 and a plurality of notches 116, offers maximum flexibility to fit most headrest posts regardless of make and model of the vehicle.

In addition, selecting different notches to place on posts 101, changes the position of hook 108 relative to how far it extends beyond seat 105. For instance, if notch 116(1) is selected, then hook 108 will extend a furthest distance away from seat 105 and into the middle of the vehicle. On the other hand, if notch 116(5) is selected, then hook 108 will extend the least amount of distance toward the middle vehicle.

As shown in FIG. 2, arm 102 also includes a pivot tab 138 located on top of surface 124 proximal to the end 140 closest to hook 108. The length of tab 138 measured (a distance D) from outer edge 112 to inner edge 142 is between approximately two and three inches. The length of tab 138 is approximately equal to the combined widths of arm 102 and arm 104. The width of tab 138 measured (a distance E) from edge 144 to edge 146 is between about one inch and two inches. The height of tab 138 is approximately the same as distance B. Tab 138 includes a pivot hole 148. Pin 106 can be placed in hole 148 to allow arm 102 and arm 104 to swivel in a scissor-like fashion. Tab 138 can be configured in such a way as to limit the distance arm 102 and arm 104 swivel. This can help prevent apparatus 100 from breaking by preventing the arms from swiveling to a point that causes stress on pin 106 and tab 138.

Arm 102 is shown as including securing tab 150. Tab 150 is located on top of surface 124 proximal to end 122 and has approximately the same dimensions as tab 138. In the illustrated embodiment, tab 150 includes a hole 151. Tab 150 clips onto arm 104 by placing securing pin 153 in hole 151 when apparatus 100 is attached to posts 101. When pin 153 is placed in hole 151, pin 153 extends beyond the bottom surface of tab 150. Pin 153 can be permanently affixed to tab 150. Those skilled in the art would appreciate that there are numerous other methods for securing arm 102 and arm 104 around posts 101.

Arm 102 may be composed of any suitable light and durable material such as aluminum, steel, wood, plastic, or any combination thereof.

Second Arm

Figure 3:
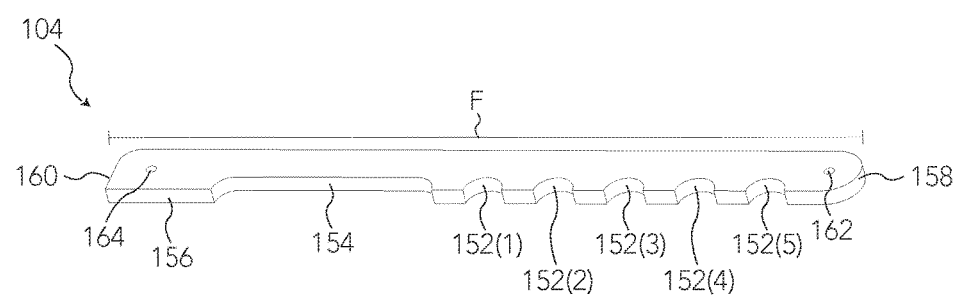
FIG. 3 shows a perspective view of the second arm from an embodiment of the hanger apparatus.

FIG. 3 shows an example arm 104, which in the illustrated embodiment, includes a second set of half-circular notches 152(1), 152(2), 152(3), 152(4), 152(5) and a second slot area 154 along inner surface 156 of arm 104.

Slot area 154 has about the same dimensions as slot area 118. Each notch 152(1), 152(2), 152(3), 152(4) and 152(5) has about the same dimensions as notches 116(1), 116 (2), 116 (3), 116 (4) and 116 (5). When apparatus 100 is attached to posts 101, slot area 154 is oppositely aligned with slot area 118 and notches 152 are oppositely aligned with notches 116. This means that slot area 154 is positioned to abut the same headrest post slot area 118 abuts, while a particular notch 152(1), 152(2), 152(3), 152(4) or 152(5) is configured to abut the other headrest post in much the same manner as a particular notch 116(1), 116 (2), 116 (3), 116 (4) or 116 (5), respectively.

Arm 104 is between about ten and twelve inches in length measured (a distance F) between distal end 158 and distal end 160.

Arm 104 includes pivot hole 162, which is proximal to distal end 158. Hole 162 corresponds with to hole 148 when apparatus 100 is fully assembled. Pin 106 will extend through hole 162 when placed in hole 148.

Arm 104 also includes securing hole 164, which is proximal to distal end 160. Hole 164 couples with pin 153 to secure arm 104 to arm 102.

Arm 104 may be composed of any suitable light and durable material such as aluminum, steel, wood, plastic, or any combination thereof.

Pin

Figure 4:
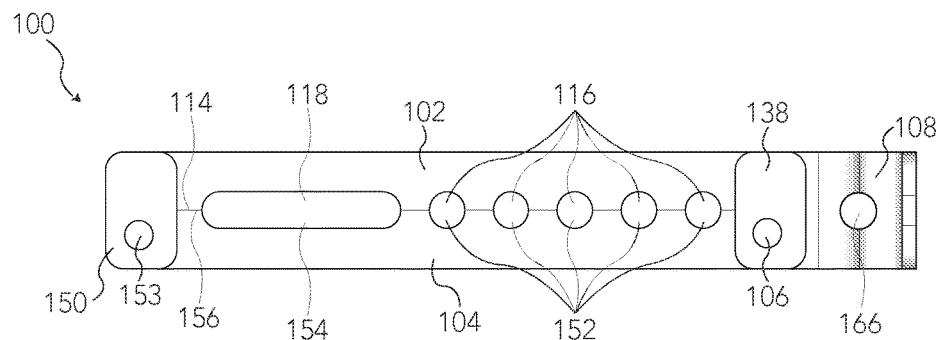
FIG. 4 shows a top view of an embodiment of the hanger apparatus.

As shown in FIG. 4, pin 106 is located at an end portion of both arm 102 and arm 104 proximal to hook 108. Pin 106 goes through hole 148 from FIG. 2, continues a distance beyond the height of tab 138 and goes through hole 162 from FIG. 3. This connects arm 102 to arm 104 and allows the two arms to swivel in a scissor-like fashion at an axis point about pin 106. Pin 106 can be permanently connected to arm 102 and arm 104 as long as permanently connecting pin 106 does not prevent arm 102 and arm 104 from swiveling in a scissor-like fashion.

Pin 106 may be composed of any suitable light and durable material such as aluminum, steel, wood, plastic, or any combination thereof.

Hook

Figure 5:
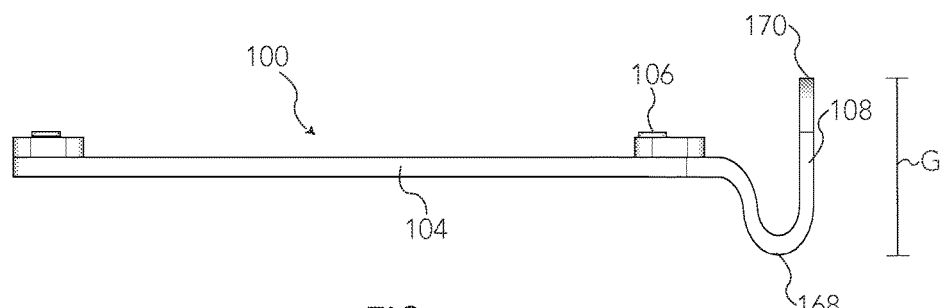
FIG. 5 shows a side view of an embodiment of the hanger apparatus.

Hook 108 is positioned at the distal end of arm 102 proximal to pin 106, as shown in FIGS. 1, 4, and 5. In another embodiment, hook 108 can also be positioned at the distal end of arm 104 proximal to pin 106 (not shown).

In FIG. 5, hook 108 is shown as having a 'U' or 'J' shape with one side connected to arm 102, the curved section continuing below the plane comprising arm 102 and arm 104, and the other end of hook 108 continuing upward past that plane. The distance from the bottom point 168 of hook 108 to the top point 170 (a distance G) is between about two and three inches.

As appreciated by those skilled in the art after having the benefit of this disclosure, hook 108 may take the form of any suitable shape that can support a hanging item in a similar manner to that of the shape described above (not shown).

Hook 108 may be composed of any suitable light and durable material such as aluminum, steel, wood, plastic, or any combination thereof.

Referring to FIGS. 1, 2, and 4, in the illustrated embodiment, hook 108 may also include a hole 166 located in a central area of the curved portion of hook 108 (or in other words at the bottom of hook 108). Hole 166 adds the ability for drivers or passengers to use a hanger or similar items (not shown) by placing one end of the hanger (not shown) through hole 166. This prevents hangers from sliding off of hook 108 when the vehicle is turning, accelerating or decelerating.

An adapter (not shown) may also be fastened around hook 108 and/or hole 166 to enable drivers and passengers to fasten or hang other items from the area around hook 108. For instance, a pocket with a hanger may be hung from hook 108 and/or hole 166; whereby the pocket enables the driver or passenger to place his/her mobile phone.

Operation

Returning to FIG. 4, when apparatus 100 is fully assembled, inner edge 114 of arm 102 and inner edge 156 of arm 104 are oppositely aligned. This allows notches 116 and notches 152 to form a series of circles that fit coextensively around a headrest post. Slot area 118 and slot area 154 also align to form a larger slot area that abuts another headrest post from the direction of both arm 102 and arm 104. In the embodiment, the combined slot area 118, 154 is elongated oval. As appreciated by those skilled in the art after having the benefit of this disclosure, notches 116 and notches 152 can have any shape that fits coextensively around a headrest post, such as a square, triangle or oval.

Together notches 116 and 152 and slot areas 118 and 154 prevent apparatus 100 from moving when apparatus 100 is attached to the posts of a headrest. They also allow the posts to support the weight of items hung from hook 108 by distributing the weight between both posts.

Tab 150 secures arm 102 to arm 104 when pin 153 is coupled to hole 164 (located below clip 153, but not visible in FIG. 4). Pulling down on the end of arm 104 proximal to tab 150 causes pin 153 and hole 164 to uncouple, which allows arm 102 to separate from arm 104. Apparatus 100 can then be installed or removed by swiveling arm 102 and arm 104 in a scissor-like fashion about pin 106. This makes installation and removal quick and easy.

Installing apparatus 100, as shown in FIG. 1, allows items to be hung from hook 108, which frees up more seat and floor space and can also prevent items from picking up dirt from the seat or the floor.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. An apparatus for installation to a first post and second post of a headrest of a motor vehicle, the apparatus comprising:
    a first arm, including a first set of half-circular notches extending along a first portion of an edge of the first arm, each half-circular notch configured to fit coextensively around about half of the first post of the headrest when the apparatus is attached to the first post and second post, the first arm also including a first slot area extending along a second portion of the same edge, the first slot area positioned to abut the second post of the headrest;
    a second arm, including a second set of half-circular notches extending along a first portion of an edge of the second arm each oppositely aligned with the first set of half-circular notches, each half-circular notch configured to fit coextensively around about half of the first post of the headrest when the apparatus is attached to the first post and second post wherein the first and second half-circular notches approximately form a circle to fit coextensively around the first post, the second arm also including a second slot area extending along a second portion of the same edge oppositely aligned with the first slot area, the second slot area positioned to abut the second post of the headrest;
    a pin located at an end portion of both the first arm and the second arm wherein the pin pivotally connects the first arm to the second arm allowing the two arms to swivel at an axis point about the pin in a scissor-like fashion; and
    a hook positioned at a distal end of either the first arm or second arm proximal to the pin.

2. The apparatus of claim 1, wherein the first arm and second arm further include a hole for receiving a second pin therein.

3. The apparatus of claim 1, wherein the hook is U-shaped.

4. The apparatus of claim 1, wherein the hook includes a hole.

5. The apparatus of claim 1, wherein the length of the apparatus is between approximately twelve and fourteen inches, the width of the apparatus is between approximately two and three inches, and the height of the apparatus is between about two and three inches.

6. The apparatus of claim 1, wherein the radius of each half-circular notch in the first set of half-circular notches is between approximately one-quarter inch and one-half inch, the radius of each half-circular notch in the second set of half-circular notches is between approximately one-quarter inch and one-half inch, the depth of the first slot area is between approximately one-quarter inch and one-half inch, the length of the first slot area is approximately two inches, the depth of the second slot area is between approximately one-quarter inch and one-half inch, and the length of the second slot area is approximately two inches.

7. An apparatus for hanging personal items in a motor vehicle so that the personal items are readily accessible to either a driver or passenger, comprising:
    a first arm, including a first hole located proximal to a distal end of the first arm and a second hole located proximal to the other distal end of the first arm, the first arm also including a first set of half-circular notches extending along a first portion of an edge of the first arm, each half-circular notch configured to fit coextensively around about half of the first post of the headrest when the apparatus is attached to the first post and second post, the first arm also including a first slot area extending along a second portion of the same edge, the first slot area positioned to abut the second post of the headrest;

a second arm, including a first hole located proximal to a distal end of the second arm and a second hole located proximal to the other distal end of the second arm, the second arm also including a second set of half-circular notches extending along a first portion of an edge of the second arm each oppositely aligned with the first set of half-circular notches, each half-circular notch configured to fit coextensively around about half of the first post of the headrest when the apparatus is attached to the first post and second post wherein the first and second half-circular notches approximately form a circle to fit coextensively around the first post, the second arm also including a second slot area extending along a second portion of the same edge oppositely aligned with the first slot area, the second slot area positioned to abut the second post of the headrest;

a first pin located in the first hole of the first arm and the first hole of the second arm wherein the pin pivotally connects the first arm to the second arm allowing the two arms to swivel at an axis point about the pin in a scissor-like fashion;

a second pin located in the second hole of the first arm and the second hole of the second arm wherein the pin connects the first arm and the second arm to each other; and a hook positioned at a distal end of the first arm proximal to the first pin.

8. The apparatus of claim 7, wherein the hook is U-shaped.

9. The apparatus of claim 7, wherein the hook includes a hole.

10. The apparatus of claim 7, wherein the length of the apparatus is between approximately twelve and fourteen inches, the width of the apparatus is between approximately two and three inches, and the height of the apparatus is between approximately two and three inches.

11. The apparatus of claim 7, wherein the radius of each half-circular notch in the first set of half-circular notches is between approximately one-quarter inch and one-half inch, the radius of each half-circular notch in the second set of half-circular notches is between approximately one-quarter inch and one-half inch, the depth of the first slot area is between approximately one-quarter inch and one-half inch, the length of the first slot area is approximately two inches, the depth of the second slot area is between approximately one-quarter inch and one-half inch, and the length of the second slot area is approximately two inches.

* * * * *